United States Patent
Jiang et al.

(10) Patent No.: US 10,281,626 B2
(45) Date of Patent: May 7, 2019

(54) COLOR IMAGE DISPLAY DEVICES COMPRISING STRUCTURAL COLOR PIXELS THAT ARE SELECTIVELY ACTIVATED AND/OR DEACTIVATED BY MATERIAL DEPOSITION

(71) Applicant: Nanomedia Solutions Inc., Vancouver (CA)

(72) Inventors: Hao Jiang, Coquitlam (CA); Bozena Kaminska, Vancouver (CA)

(73) Assignee: Nanomedia Solutions Inc., Vancouver (CA)

(*) Notice: Subject to any disclaimer, the term of this patent is extended or adjusted under 35 U.S.C. 154(b) by 257 days.

(21) Appl. No.: 15/217,587

(22) Filed: Jul. 22, 2016

(65) Prior Publication Data
US 2017/0023711 A1    Jan. 26, 2017

Related U.S. Application Data

(60) Provisional application No. 62/196,940, filed on Jul. 25, 2015.

(51) Int. Cl.
*G02B 5/00* (2006.01)
*G02B 5/18* (2006.01)
(Continued)

(52) U.S. Cl.
CPC .......... *G02B 5/1842* (2013.01); *G02B 5/008* (2013.01); *G02B 5/1809* (2013.01);
(Continued)

(58) Field of Classification Search
CPC .... G02B 5/1842; G02B 5/1847; G02B 5/201; G02B 5/1809; G03H 1/182; G03H 1/0244;
(Continued)

(56) References Cited

U.S. PATENT DOCUMENTS

| 7,113,690 B2 | 9/2006 | Lai et al. |
| 7,787,182 B2 | 8/2010 | Schnieper et al. |

(Continued)

FOREIGN PATENT DOCUMENTS

| WO | WO 2005/053115 | 6/2005 | |
| WO | WO-2013178349 A1 * | 12/2013 | ........... B24D 25/351 |

(Continued)

OTHER PUBLICATIONS

Yindar Chuo et al.; Rapid fabrication of nano-structured quartz stamps; IOP Publishing; Nanotechnology 24 (2013), 11 pages.
(Continued)

*Primary Examiner* — Kimberly N. Kakalec
(74) *Attorney, Agent, or Firm* — Hickman Palermo; Becker Bingham LLP; Malgorzata A. Kulczycka

(57) ABSTRACT

A color image display device comprising arrays of structural color pixels, where said structural color pixels may be formed on a single substrate layer or multiple substrate layers and are patterned by selective material deposition to display a color image in accordance with input color images or patterns. The structural color pixels comprise a plurality of microstructures and/or nanostructures, including without limitation, diffraction gratings, sub-wavelength structures, to display colors in red, green, blue in RGB color space or cyan, magenta, yellow in CMY color space. Examples include methods of activating and/or deactivating structural pixels using selective material deposition onto at least one layer of the color display device to form a color image. Further examples include product labels, authentication devices and security documents carrying customized or personalized information and methods for their manufacture.

33 Claims, 18 Drawing Sheets

(51) Int. Cl.
*G02B 5/20* (2006.01)
*G03H 1/02* (2006.01)
*G03H 1/18* (2006.01)
*G06K 19/06* (2006.01)

(52) U.S. Cl.
CPC .......... *G02B 5/1847* (2013.01); *G02B 5/201* (2013.01); *G03H 1/0244* (2013.01); *G03H 1/182* (2013.01); *G03H 2001/183* (2013.01); *G03H 2001/187* (2013.01); *G06K 19/0614* (2013.01); *G06K 19/06084* (2013.01)

(58) Field of Classification Search
CPC ....... G03H 2001/187; G03H 2001/183; G06K 19/0614; G06K 19/06084
See application file for complete search history.

(56) References Cited

U.S. PATENT DOCUMENTS

| | | |
|---|---|---|
| 8,253,536 B2 | 8/2012 | Kaminska et al. |
| 8,270,050 B2 | 9/2012 | Schnieper et al. |
| 2004/0202829 A1* | 10/2004 | Zercher ................. B42D 25/00 428/195.1 |
| 2005/0001419 A1* | 1/2005 | Levy ....................... B41M 5/24 281/2 |
| 2011/0222152 A1* | 9/2011 | Lundvall ............ G02B 27/2214 359/463 |
| 2012/0127547 A1* | 5/2012 | Gocho ................. B42D 25/324 359/2 |
| 2012/0139230 A1* | 6/2012 | Whiteman ............. G02B 1/005 283/72 |
| 2012/0162771 A1* | 6/2012 | Walter ................. G02B 5/1809 359/569 |
| 2012/0319395 A1* | 12/2012 | Fuhse ................. G02B 5/1842 283/67 |
| 2015/0042702 A1 | 2/2015 | Jiang et al. |
| 2015/0213666 A1* | 7/2015 | Schiffmann .......... B42D 25/351 283/70 |
| 2016/0146984 A1 | 5/2016 | Jiang et al. |

FOREIGN PATENT DOCUMENTS

| | | |
|---|---|---|
| WO | WO 2014/179891 | 11/2014 |
| WO | WO 2014/179892 | 11/2014 |

OTHER PUBLICATIONS

Yi-Kuei Ryan Wu et al.; Angle-Insensitive Sturctural Colours based on Metallic Nanocavities and Coloured Pixels beyond the Diffraction Limit; Scientific Reports; Published Feb. 1, 2013, 6 pages.
Karthik Kumar et al.; Printing colour at the optical diffraction limit; Nature Nanotechnology; Letters; vol. 7/ Sep. 2012 Published online: Aug. 12, 2012; www.nature.com/naturenanotechnology, 5pg.
Henry I. Smith et al.; A low-cost complement or competitor to scanning-electron-beam lithography; Elsevier; MicroElectronic Engineering 83 dated (2006), 6 pages.
Guangyuan Si et al.; Reflective plasmonic color filters based on lithographically patterned silver nanorod arrays; Nanoscale RSC Publishing; The Royal Society of Chemistry 2013, 7 pages.

* cited by examiner

Red, P=640 nm      Green, P=545 nm   500 nm    Blue, P=455 nm

COLOR IMAGE DISPLAY DEVICES COMPRISING STRUCTURAL COLOR PIXELS THAT ARE SELECTIVELY ACTIVATED AND/OR DEACTIVATED BY MATERIAL DEPOSITION

CROSS-REFERENCE TO RELATED APPLICATION(S)

This application claims the benefit of the filing date of Provisional Patent Application No. 62/196,940 entitled COLOR IMAGE DISPLAY DEVICES COMPRISING STRUCTURAL COLOR PIXELS THAT ARE SELECTIVELY ACTIVATED BY MEANS OF MATERIAL DEPOSITION, filed Jul. 25, 2015, the contents of which are hereby expressly incorporated by reference into the Detailed Description of Example Embodiments herein below.

TECHNICAL FIELD

Example embodiments relate to optical display devices and additive manufacturing, and more particularly to color image display devices using structural color pixels and methods for their manufacture and use.

BACKGROUND

Structural color pixels, such as diffraction gratings, sub-wavelength structures, and plasmonic structures, display colors owing to interaction of light with physical structures. The structural colors display unique optical effects and have been widely used in security applications. Color images comprising diffractive grating structures have been used in authentication and anti-counterfeit applications, such as those demonstrated by Lai et al. (U.S. Pat. No. 7,113,690 B2, Sep. 26, 2006) and Schnieper et al. (U.S. Pat. No. 7,787,182 B2, Aug. 31, 2010; U.S. Pat. No. 8,270,050 B2, Sep. 18, 2012). A metal film having sub-wavelength apertures can be patterned to display color images which can be applied towards security applications, in accordance with the teaching of Kaminska et al. (U.S. Pat. No. 8,253,536 B2. Aug. 28, 2012), having a common co-inventor as the present application. Full color optical displays comprising nano-structure arrays with RGB or CMYK colors have been demonstrated by Landrock et al. (PCT Patent Publication No. WO 2014/179891 A1, Nov. 13, 2014; PCT Patent Publication No. WO 2014/179892 A1, Nov. 13, 2014). Kumar et al. (Nat. Nanotechnol. 7, 557, 2012) teaches that sub-wavelength structures comprising apertures and disks can serve as bright color pixels that allow for printing a color image in a resolution comparable with optical diffraction limit.

Conventional techniques of manufacturing structural color image display devices usually include originating a master stamp using micro/nano fabrication tools according to the desired image and replicating the devices into large quantity using a roll-to-roll process. Chuo et al. (Nanotechnol. 24, 055304, 2013) teaches that one image master stamp comprised of nano-hole arrays can be originated using electron beam lithography (EBL) followed by reactive ion etching (RIE). Laser interference lithography (LIL) is another effective method to expose micro-grating patterns and to originate an image master stamp, in accordance with the teaching of Gagnon et al. (PCT Patent Publication No. WO 2005/053115 A2, Jun. 9, 2005). Both EBL and LIL techniques expose the image patterns onto the substrate point by point and the fabrication process is usually lengthy and expensive. Zone-plate-array lithography (ZPAL) is a technique that can write the subregion of the image pattern in parallel with high throughput, in accordance with the teaching of Smith et al. (Microelectronic Engineering, 83, pp. 956-961, 2006). These above-mentioned popular manufacturing methods all require expensive equipment and it is not practical to include personalized or customized information into the color display device.

Other difficulties with existing systems and techniques may be appreciated in view of the Detailed Description of Example Embodiments herein below.

SUMMARY

In some example embodiments, there is provided an apparatus named as generic substrate comprising a pixel layer that is composed of arrays of structures as primary red, green and blue color subpixels in RGB color space.

In some example embodiments, the pixel layer of the generic substrate is composed of at least one type of microstructures and/or nanostructures that display structural colors for specific optical bands. The optical bands may vary depending on the light incidence angles and/or viewing angles. The optical bands may also be angle-robust and are not sensitive to light incidence and/or viewing angles.

In some example embodiments, there is provided an instrument and methods for manufacturing color image display devices using selective material deposition onto the subpixels of the generic substrate in accordance with the input color image. The generic substrate is universal for any color image, while the subpixels are selectively activated and/or deactivated by material deposition. The different visual colors are achieved via half-tone mixing of the primary colors. After material deposition, the devices may be further laminated with index-matching film and said film can deactivate unwanted structural color subpixels, and/or tune the colors of the structural color subpixels, and/or protect the device surface.

In an example embodiment, the generic substrate comprises arrays of structures as primary cyan, magenta and yellow color subpixels in CMY color space on one layer of the substrate. In an example embodiment, the generic substrate is composed of two dimensional arrays of primary color subpixels and the generic substrate may also further include subpixels of invisible optical band to allow additional covert information being embedded into the same layer of the displayed color images.

In some example embodiments, there are provided different types of microstructures and nanostructures that can be used as structural subpixels in the pixel layer of the generic substrate. In an example embodiment, sub-wavelength structures are used as structural pixels and the colors are caused by surface plasmons of the metal film deposited onto the sub-wavelength structures.

In an example embodiment, there is provided a method for manufacturing the color image display devices from the generic substrate using selective material deposition and the deposited materials preserving the geometries of the structural pixels in contact are transferred onto the surface of another layer. After transfer, the device surface may be further laminated and the generic substrate can be reused for manufacturing a different color image display device.

In an example embodiment, there is provided a personalized authentication device comprising the above-described color image display devices in the entire said authentication device or in at least one subregion of said authentication device. Personalized and customized information including without limitation, name, date of birth, barcodes containing personal information, is patterned into the color image display device region using selective material deposition. The authentication device may display optically variable effects.

In an example embodiment, there are provided multiple types of generic substrates, wherein each substrate is comprised of at least one type of micro-/nano-structures to display colors of interest. The color display device is manufactured by selective material deposition on each substrate separately and then bond the deposited substrates into one piece of device.

Another example embodiment is a system for fabricating a color image display device, including: a generic substrate comprising a pixel layer which is generic to any pattern, said pixel layer including at least one type of structural pixels, each pixel defined by at least one microstructure or nanostructure having at least one specific optical property including a specific optical band or a specific color; a processor for determining a pattern; and an inkjet printing head controlled by the processor to selectively deposit ink material onto individual pixels of the pixel layer in accordance with the pattern to activate or deactivate individual of said pixels to form a color image.

BRIEF DESCRIPTION OF THE DRAWINGS

Embodiments will now be described by way of examples with reference to the accompanying drawings, in which like reference numerals are used to indicate similar features, and in which.

DETAILED DESCRIPTION OF EXAMPLE EMBODIMENTS

Although patterning structural pixels to form into a color image is usually an expensive and lengthy process, replication of the patterned structural pixels are fairly simple and low-cost, using thermal embossing or ultra-violet (UV) embossing. In addition, although the structural pixels have complex geometries in microscale or nanoscale details, the sizes of effective pixels are usually in the microscale or sub-millimeter scale to be sensed by human naked eyes. Jiang et al., having common co-authors of the present application, teaches that full color image displays can be produced by overlaying an intensity control layer (ICL) on top of a substrate pre-patterned with arrays of structural pixels, and the ICL patterns the brightness of the subpixels to produce color images with embedded covert information (U.S. Patent Application Publication No. 2015/0042702 A1, Feb. 12, 2015). The substrate is generic for any color image and the ICL is customized using micro-scale patterning technology. Such a technique allows any color image display device to be produced using structural color pixels but such device includes two separate functional layers and often requires special chemical treatment. Jiang et al., having common co-authors of the present application, also teaches that full color image displays can be produced by selectively negating structural pixels or selective replication of structural pixels from a substrate pre-patterned with arrays of structural pixels (U.S. Patent Application Publication No. 2016/0146984 A1, May 26, 2016).

Additive manufacturing using printing techniques can potentially revolutionize many industries and research fields. Inkjet printing can be applied to manufacture wide range of devices, including without limitation, polymer transistors, artificial organs and customized ergonomic products. Color images can be conveniently printed on a paper of polymer substrate using desktop inkjet printers or professional inkjet printers, but at least two types of color inks and at least two jetting devices are needed to form a color pattern composed of more than one colors. Such color inks are usually based on dyes or pigments or nano-particles and the colors may fade due to oxidation.

At least some example embodiments relate to color image display devices comprising structural color pixels and their manufacture using selective material deposition. In an example embodiment, there is provided a generic substrate, including arrays of subpixels composed of micro/nano-structures that display structural colors. In some example embodiments, there are provided several methods and an instrument for activating and/or deactivating structural color pixels on the generic substrate. In some example embodiments, there is provided an authentication device comprising the color image displays carrying personalized or customized information.

Figure 1A:
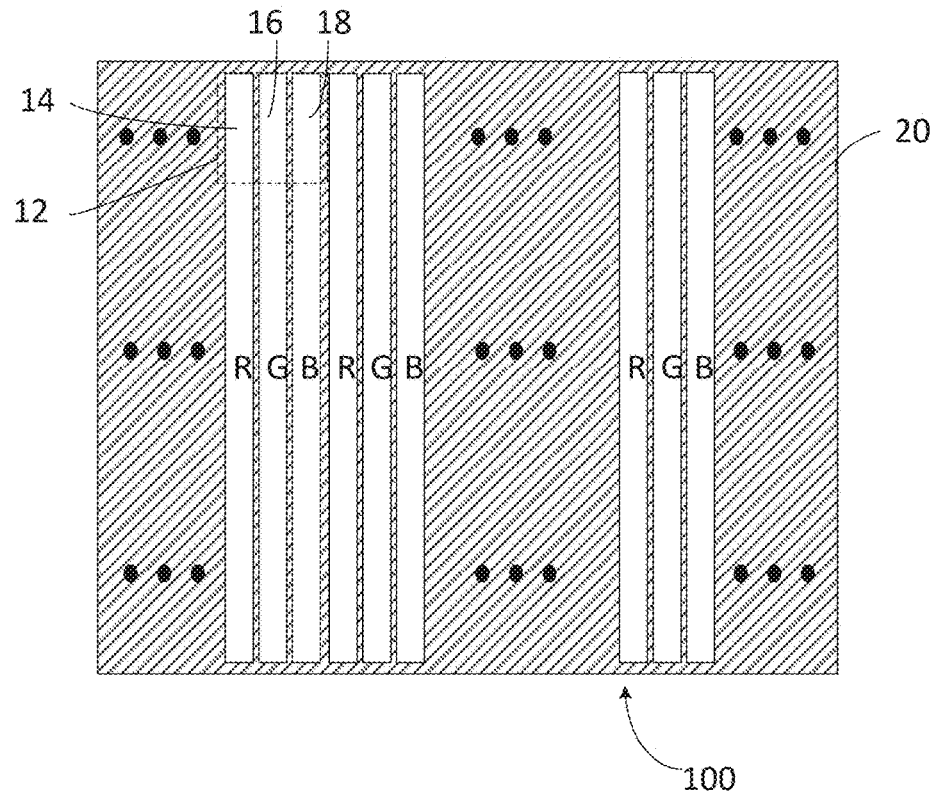
FIG. 1A shows a schematic top view of the primary color subpixels in the pixel layer of the generic substrate in accordance with one example embodiment.
Figure 1B:
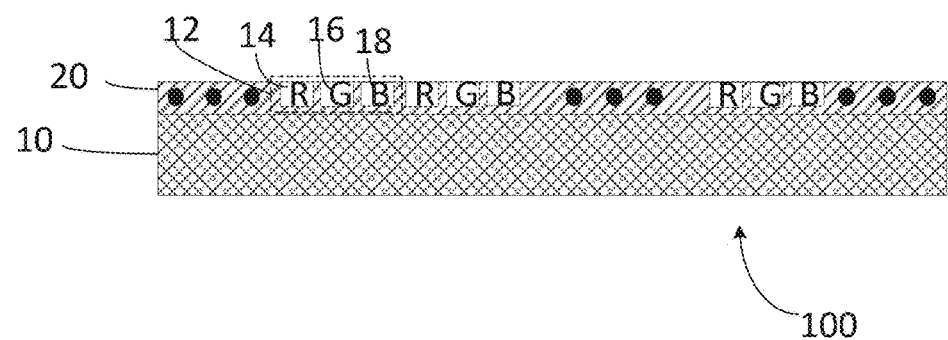
FIG. 1B shows a schematic cross sectional view of the generic substrate.

Referring now to FIG. 1A and FIG. 1B, numeral 100 indicates a generic substrate, in accordance with an example embodiment. Generally speaking, generic substrate 100 is composed of substrate 10, pixel layer 20 and any additional functional layer between layer 10 and layer 20. The material comprising substrate 10 is, in an example embodiment, transparent and is glass or polymer. Pixel layer 20 comprises arrays of primary color pixels constructed by microstructures and/or nanostructures which display structural colors. There may also be certain fiducial marks on at least one layer of the generic substrate 100, for the purpose of aligning the generic substrate 100 with the manufacturing instrument. Layer 10 and layer 20 may also be merged into a single layer wherein the pixel layer includes the substrate by itself. In some example embodiments, the layers on the generic substrate 100 may be modified in accordance with the methods for manufacturing the color image display devices.

In at least some example embodiments, reference to sub-wavelength can include a nano-structure or defined aperture, or defined pillar, or defined particle, or a defined cavity, which is smaller than the wavelength of the electromagnetic field, radiation and/or light incident upon that structure or defined aperture. Similarly, in some example embodiments, any reference to "nano" herein can be similarly modified, configured or applied to other sizes of structures, including pico or smaller, micro or larger, depending on the particular application and/or the incident electromagnetic wave.

FIG. 1A illustrates the layout of the subpixels on the pixel layer 20. Each pixel set 12 is composed of at least two types of subpixels, which are typically in a same region or proximity. For example, the pixel set 12 may include at least three primary color subpixels, e.g. red subpixel 14, green subpixel 16 and blue subpixel 18, following the RGB color system. The name "subpixels" can follow typically nomenclature for foundation subpixels of a color system, but subpixels can also sometimes be referred to as "pixels" in example embodiments. In at least some example embodiments, each pixel set 12 may also contain at least one type of invisible subpixel, which can carry covert information by giving radiation in infrared or ultraviolet bands. The size of each type of subpixel can range from 200 nanometers (nm) to 500 micrometers ($\mu$m) and even larger, and different types of subpixels may have the same size or different sizes (e.g. depending on fabrication capabilities, the particular application, the nature of the incident electromagnetic field, etc.). Each subpixel is constructed with microstructures and/or nanostructures. The nanostructures can be nano-pillar arrays, nano-hole arrays, nano-particles, nano-slits, nano-cavities, nano-hole-nano-particle hybrids or a film structured with periodic topography. While the pixel set 12 in the example embodiments uses RGB color system for displaying visible colors, it may also be constructed from CMY color system with cyan, magenta and yellow subpixels. The pixel set 12 may include more than three types of subpixels. In other example embodiments, the pixel set 12 can include subpixels which are colors that define a color space. The pixel set 12 may also include subpixels having at least two different other optical properties such as different angle-dependence, which may or may not have the same optical band.

At least some of the subpixels in the pixel set 12 are of a respective proximity or distance to each other so that the effective perceivable output of the manufactured color image display devices can be perceived or viewed as a combined color of the individual subpixels. For example, a 50% red subpixel and a 50% blue subpixel in a pixel set 12 are of a distance or suitably close so that the effective visual output can be viewed as violet/magenta (to a human being, for example).

While the shapes of the subpixels in some example embodiments are illustrated as being stripes extending through the entire generic substrate, other shapes are also possible, including without limitation, square or rectangular or circular or triangular shapes. Within each pixel set 12, the locations of subpixels can have different configurations than the example embodiments, without deviating from the teachings of the present disclosure. The pixel set 12 and/or the subpixels can be arranged in an array, a grid, an aperiodic, and/or a periodic arrangement.

Figure 2A:
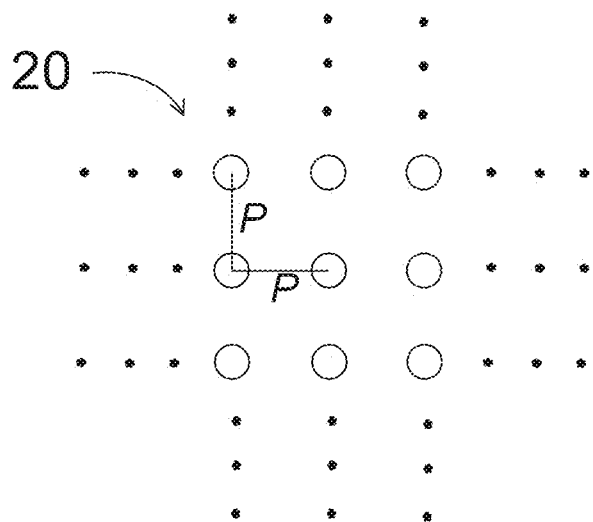
FIG. 2A shows a schematic top view of the nano-grating structures for one subpixel on the generic substrate.
Figure 2B:
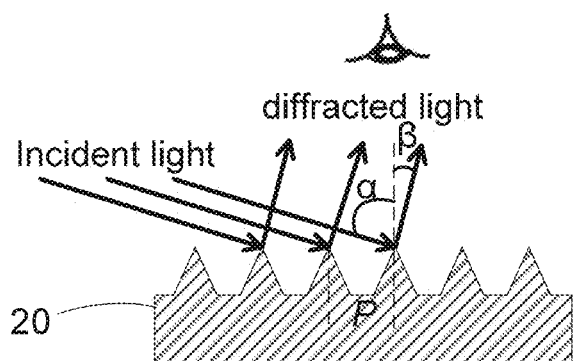
FIG. 2B shows a cross sectional view of one nano-grating and the grating effects in displaying structural colors in 1st diffraction grating order.

In the example embodiments, the subpixels are constructed by two-dimensional (2D) nano-gratings. FIG. 2A shows a schematic top view of a nano-grating, wherein the 2-D nano-grating has sub-wavelength pillars (nano-pillars) arranged into square lattice periodic array. The center-to-center spacing between the neighboring pillars is given by P. In each nano-grating structure the interference of light wave causes angle-dependent light diffraction, giving specific diffraction color. As shown in FIG. 2B, white light (polychromatic light) is incident at an angle α relative to the normal of the device surface. The nano-grating structure diffracts the $m^{th}$ grating order into the direction at angle β for light of wavelength λ. The relation that links P with λ is given by Equation (1):

$$nP(\sin \alpha - \sin \beta) = m\lambda \tag{1}$$

In some example embodiments, white light is incident at 80° (i.e., α=80°) and is diffracted into the direction perpendicular to device surface (i.e., β=0°). The red, green and blue subpixels diffract light with λ equal to 630 nm, 540 nm, and 450 nm, respectively. The $1^{st}$ reflection grating order is chosen, i.e. (m=1).

Figure 2C:
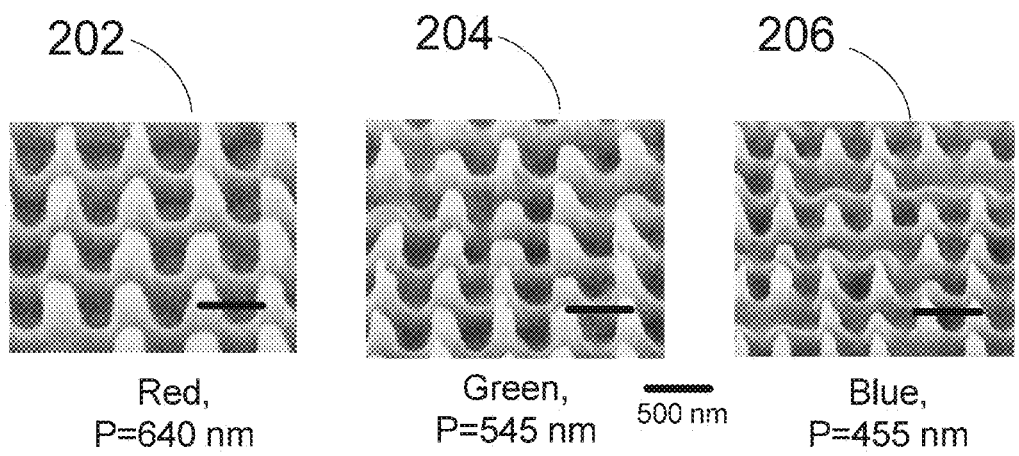
FIG. 2C shows scanning electron microscope images of the nano-grating structures of nano-pillar arrays which display red, green and blue colors.

FIG. 2C shows the scanning electron microscope (SEM) images at 45° angle of the pixel layer of one example embodiment. A 16 nm thick gold layer was deposited on the surface using sputtering deposition to make the surface conductive for SEM imaging purpose only. The pixel layer 20 can be configured with the following geometrical parameters: P=640 nm for red subpixel 14 (image 202). P=545 nm for green subpixel 16 (image 204) and P=455 nm for blue subpixel 18 (image 206). The nano-pillars are in the conical shape with wider bases and sharper tips.

In order to manufacture the generic substrates in large quantity, a master stamp was first fabricated using nanofabrication tools including electron beam lithography and reactive ion etching. The generic substrates were replicated from the master stamp using nanoimprint lithography. It should be noted that the cost in fabricating the master stamp is a one-time cost because the same stamp can be reused to manufacture color image display devices for any given color images or color patterns.

Figure 3A:
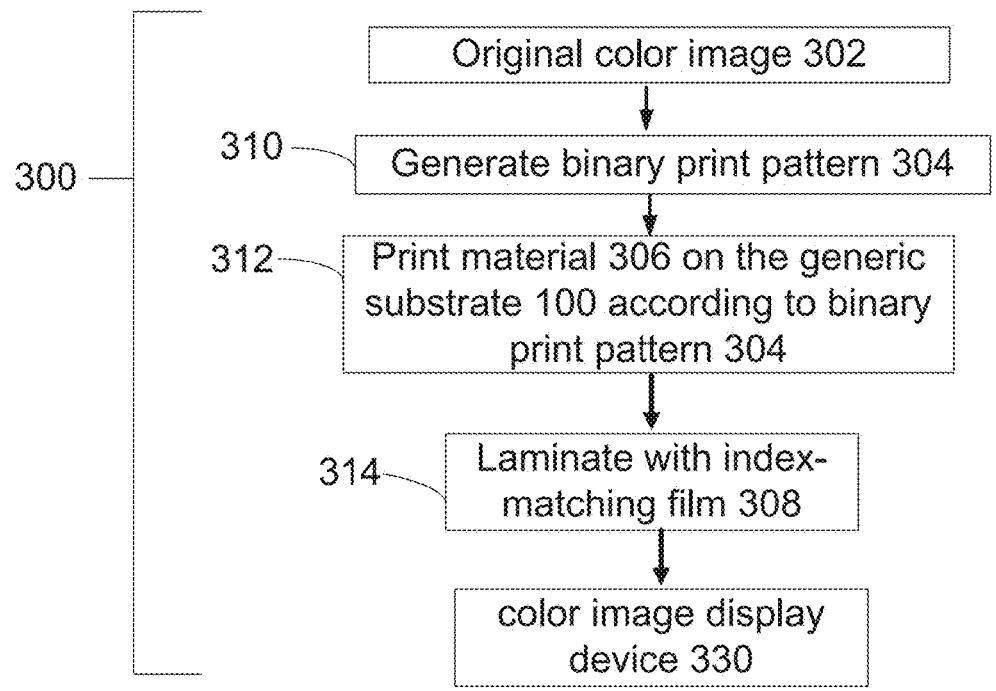
FIG. 3A shows a method for manufacturing color image display devices by selective material deposition onto the generic substrate.
Figure 3B:
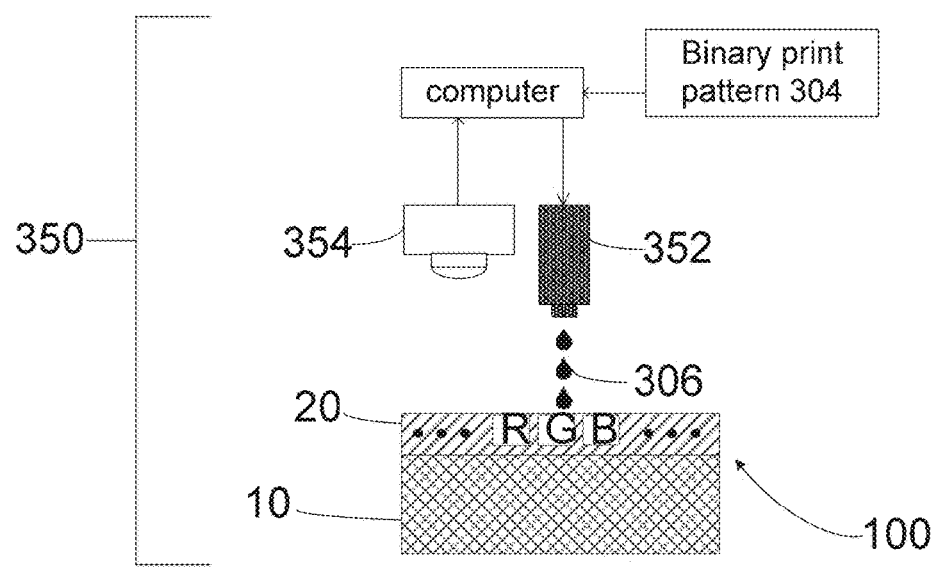
FIG. 3B shows an instrument to deposit material onto the generic substrate.

FIG. 3A shows a schematic of a method 300 for manufacturing the color image display device using selective material deposition onto the generic substrate 100. FIG. 3B shows a schematic view of an instrument 350 for depositing material onto the generic substrate 100. The digital file of original color image 302 is imported into a custom-written software to produce a binary print pattern 304 to be used for material deposition (step 310). The generic substrate is loaded into a material deposition instrument 350 comprising an inkjet printing head 352, a microscopic imaging device 354 and a computer which includes a microprocessor or processor. The inkjet printing head 352 typically further comprises an ink tank, a cartridge, jetting nozzles and control circuits. Additional parts or an entirety of an inkjet printer can be used in an example embodiment. Through the imaging device 354, the printing head 352 is first accurately aligned with the subpixels of the generic substrate 100 and then the printing head 352 deposits ink material 306 onto the surface of the subpixels in accordance with the binary print pattern 304 (step 310). After material deposition, given sufficient amount of time, the ink material 306 printed onto the generic substrate dries up into solid films coated on the subpixels. At step 314 (optional in some example embodiments, depending on the particular application), the device surface is laminated with an index-matching film 308 having the same refractive index as the material composing the pixel layer. The color image display device 330 is thus manufactured.

In at least some example embodiments, reference to selective material deposition can include any material deposition technique that can deposit material into a pattern defined by the user's input. The available selective material deposition techniques shall include without limitation, inkjet printing, laser printing, offset printing, screen printing, spray coating, stencil printing, contact printing, transfer printing and lithography printing.

Figure 4A:
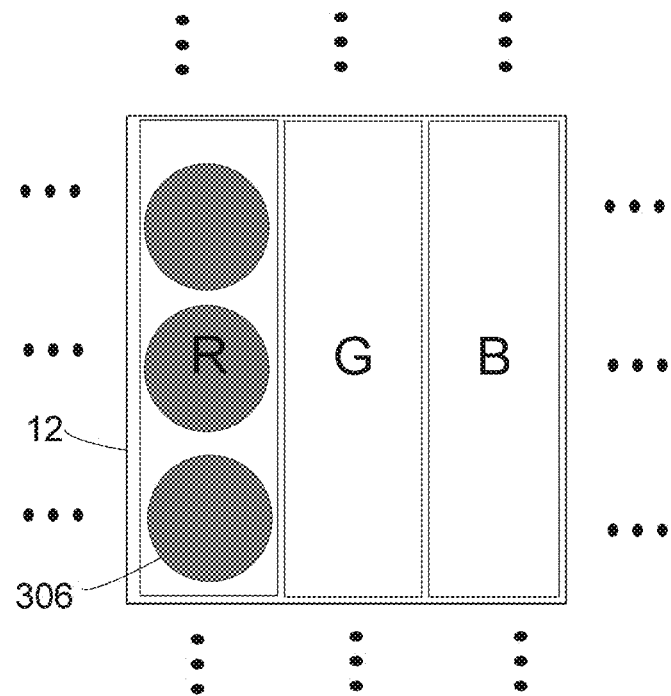
FIG. 4A shows a schematic top view of activating one red subpixel with selective material deposition.
Figure 4B:
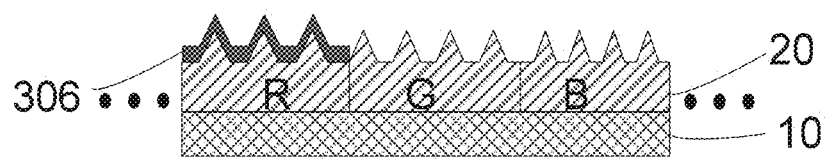
FIG. 4B shows a schematic cross sectional view of activating one red subpixel with selective material deposition.
Figure 4C:
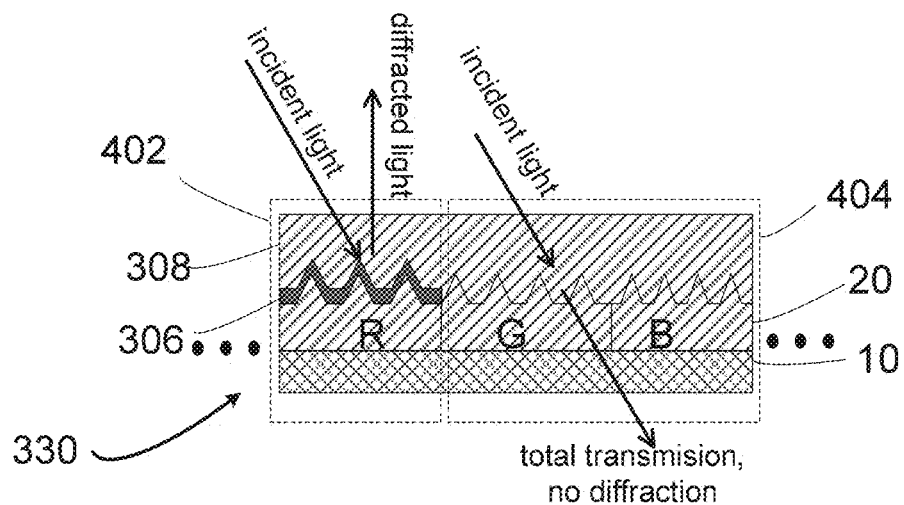
FIG. 4C shows a schematic cross sectional view of laminating the device surface with an index-matching film and the interaction of the device with light incident from top.
Figure 4D:
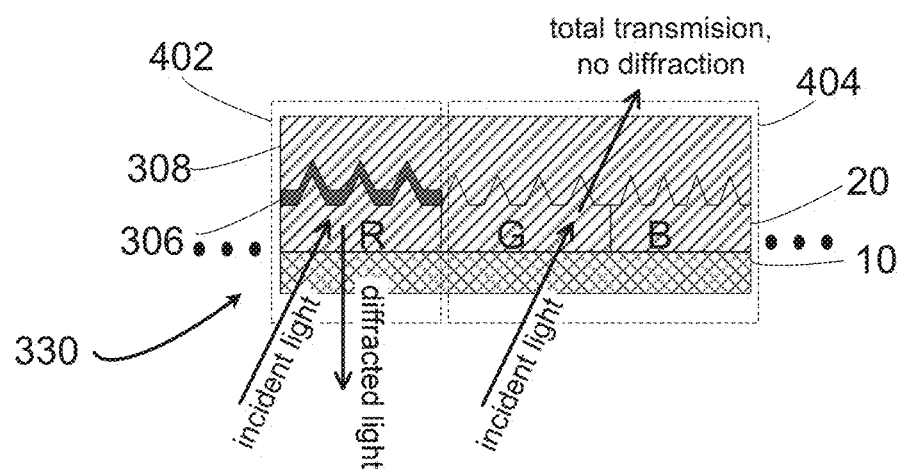
FIG. 4D shows a schematic cross sectional view of laminating the device surface with an index-matching film and the interaction of the device with light incident from bottom.

Reference is now made to FIGS. 4A, 4B, 4C, and 4D which schematically shows a process for activating subpixels using the ink material 306 selectively deposited upon said subpixels. FIG. 4A and FIG. 4B show the schematic top view and cross sectional view, respectively, of ink material 306 deposited onto the red subpixel of a pixel set 12. The ink material 306 must be composed of a material having different refractive index than the material composing the pixel layer 20, and in an example embodiment, is metal, such as silver, aluminum, gold or high-refractive-index dielectric material such as indium tin oxide, zinc oxide, titania, and zinc sulfide. By controlling the ink material composition and the surface chemical properties of the pixel layer 20, the deposited ink material 306 can form into separate dots and each said dot forms into a thin film coated on the surface of subpixel structures. As a result, the geometries of the structural pixels are preserved into the thin-film dots. FIG. 4C shows a cross sectional view of the lamination process of index-matching film where a layer 308 having refractive index same as or close to the material composing pixel layer 20 is coated on top of the device. The lamination process is typically carried out by applying a liquid polymer material that can be cured by heat or ultra-violet radiation. In region 402 where red subpixel is covered by the thin-film dots, for light incident from the top, red subpixel can still diffract light into viewer's eyes because of the nanostructured shapes preserved in the printed thin-film dots while the green and blue subpixel cannot diffract light because the index-matching film 308 turns the region 404 into a uniform transparent film without any optical feature. As a result, the pixel set 12 displays only red color. Similarly, for the light incident from bottom, as shown in FIG. 4D, red subpixel is activated while green and blue subpixel are deactivated.

A key for activation of the structural pixel is that the printed thin-film dots must have one side or both sides conformal to the nanostructures in pixel layer 20. In general, the bottom side of the printed material contacting the pixel layer is always conformal to the nanostructures and can display structural colors. The top side of the printed material, depending on the surface properties of the substrate, may or may not preserve the shape of the nanostructures depending on the particular embodiment or application.

Figure 5:
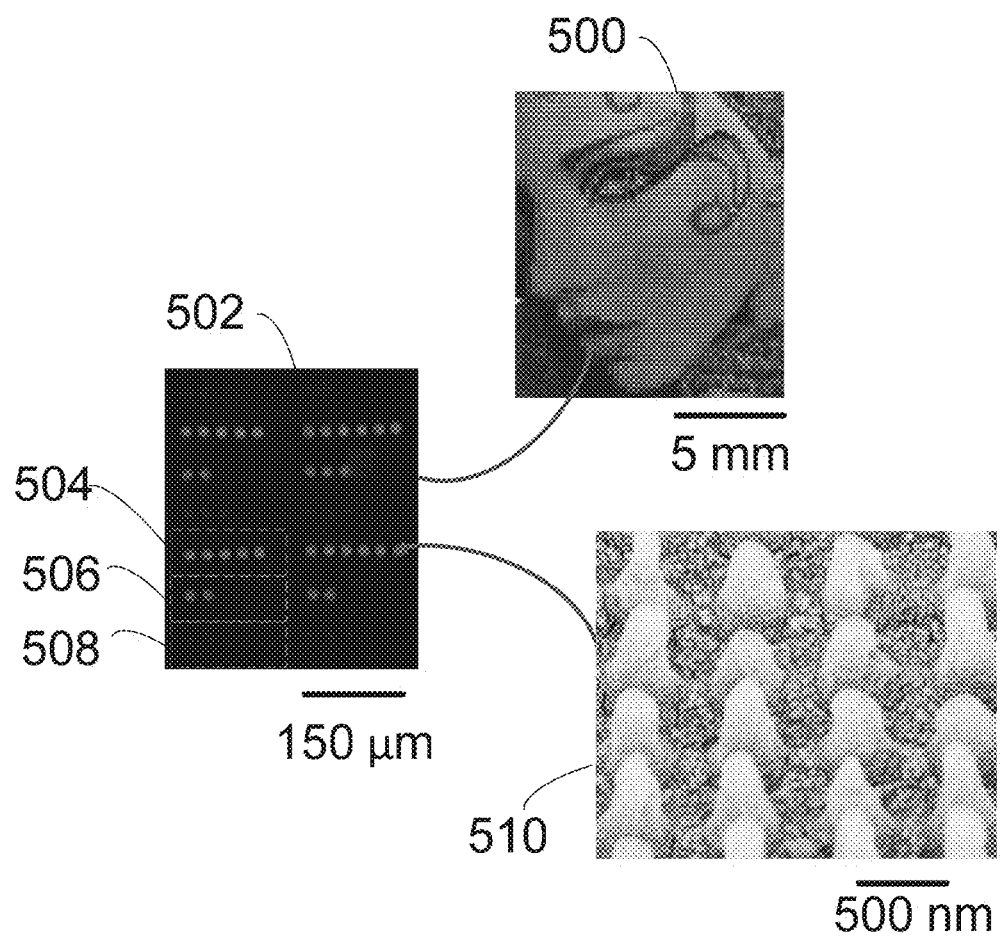
FIG. 5 shows an example of a manufactured color image display device carrying a face photo.

FIG. 5 shows an example of a manufactured color image display device carrying a face photo. Fujifilm Dimatix Material Depositor DMP-2831 with 1 pL drop volume cartridge was used as the material deposition instrument 350. Silver nano-particle ink (particle diameter ≤50 nm) was used as the ink material 306. Each subpixel in the generic substrate 100 is 70 μm wide and each pixel set 12 has a size of 210 μm×210 μm, which corresponds to about 121 pixels per inch (PPI) resolution in displaying the color image. Silver dots were printed at a minimum drop spacing of 30 μm. Image 500 shows the photographic image of the face photo displayed on the manufactured color image display device. Image 502 shows the optical microscope image of the region on the pink/violet lips. Region 504, 506 and 508 is the region of one red, green and blue subpixel from the generic substrate, respectively. 5 red dots, 2 green dots and 2 blue dots of structural pixels together display the pink/violet color of the lips. Average printed silver dot size is between 16 μm and 18 μm. According to image 502, only the structural pixels covered by silver ink remain active in displaying diffractive colors and uncovered structural pixels are deactivated by index matching. Image 510 shows a 45° SEM image of one silver dot printed on a red subpixel. The nano-pillars are coated by closely-packed silver nano-particles that form into a thin-film conformal to the nano-pillar surface.

Figure 6A:
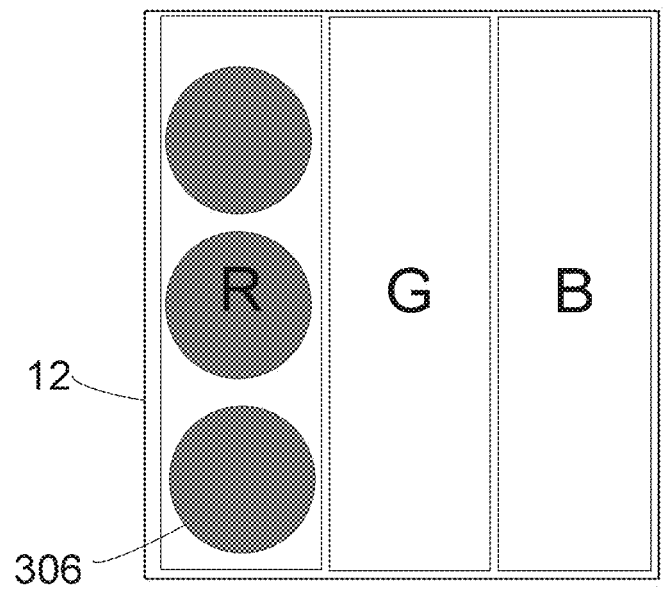
FIG. 6A shows a schematic top view of deactivating one red subpixel with selective material deposition.
Figure 6B:
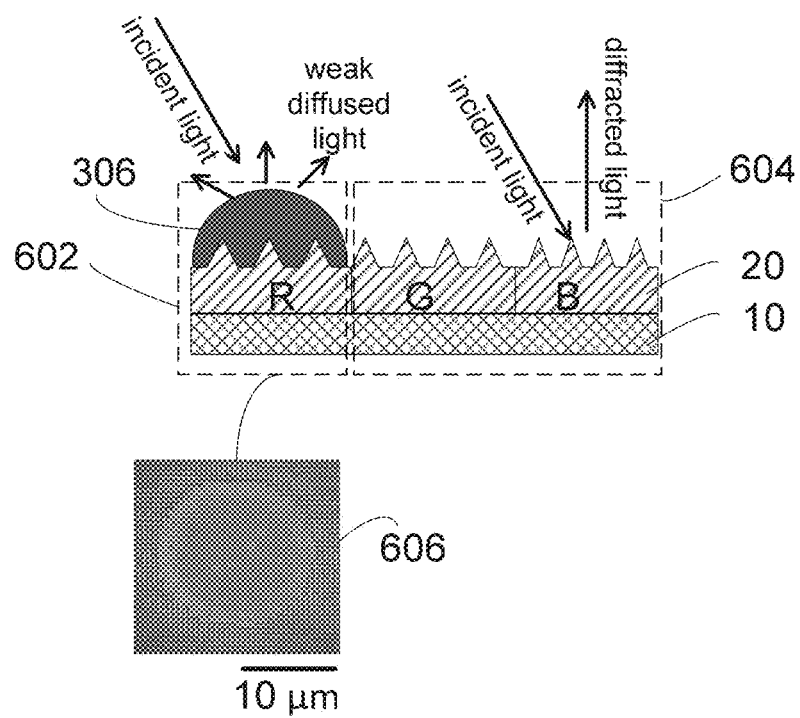
FIG. 6B shows a schematic cross sectional view of deactivating one red subpixel with selective material deposition and the interaction of the device with light incident from top.

Reference is now made to FIGS. 6A and 6B which schematically shows a process for deactivating subpixels using the ink material 306 selectively deposited upon said subpixels. FIG. 6A and FIG. 6B show the schematic top view and cross sectional view, respectively, of ink material 306 deposited onto the red subpixel of a pixel set 12. In order to deactivate the subpixel, the ink material 306 should be composed of a material that can efficiently attenuate light, and in an example embodiment, is black ink, such as carbon inks, and metal, such as silver, aluminum and gold. The ink material can also be composed of a material that has refractive index close to the material composing pixel layer 20 and the deactivation of subpixel is caused by index matching that annihilates the optical features. It should be clarified that if metal-based ink is used as the ink material 306, the ink composition and/or surface chemical properties of the pixel layer 20 should be configured such that the deposited metal forms into an optically thick film (thickness ≥200 nm). In region 602, the structural color of red subpixel is blocked by the thick metal film. Image 606 is a 30° SEM image of a silver dot deposited on a red subpixel using high concentration silver nano-particle ink. Nano-grating structures under the silver dots are completely submerged by the thick silver film. The thick silver film can only diffuse very weak colorless light into viewer's eyes. In region 604, the green and blue subpixels can still diffract light to display structural colors. As a result, the red subpixel has been deactivated by depositing the light attenuating ink materials.

The color image display device manufactured using process shown in FIGS. 6A and 6B is prone to surface contamination because the functioning subpixels in region 604 must be exposed to ambient environment and are not protected by any additional layer. Adding a protection layer onto said device surface may significantly reduce the brightness of the functioning subpixels due to the reduced refractive index contrast of the structures and may also shift the colors of the functioning subpixels. To address this problem, in an alternative embodiment, a thin contrast film is introduced onto the pixel layer prior to the selective material deposition.

Figure 7A:
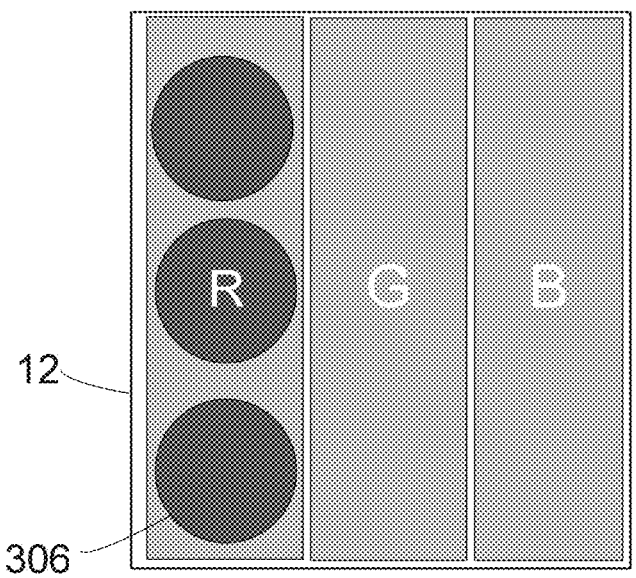
FIG. 7A shows a schematic top view of deactivating one red subpixel with selective material deposition wherein the pixel layer is coated with a thin film prior to material deposition.
Figure 7B:
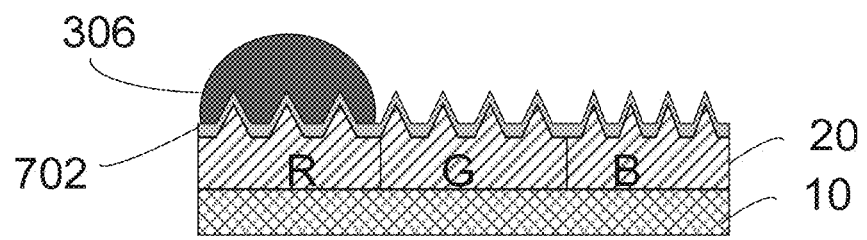
FIG. 7B shows a schematic cross sectional view of deactivating one red subpixel with selective material deposition wherein the pixel layer is coated with a thin film prior to material deposition.
Figure 7C:
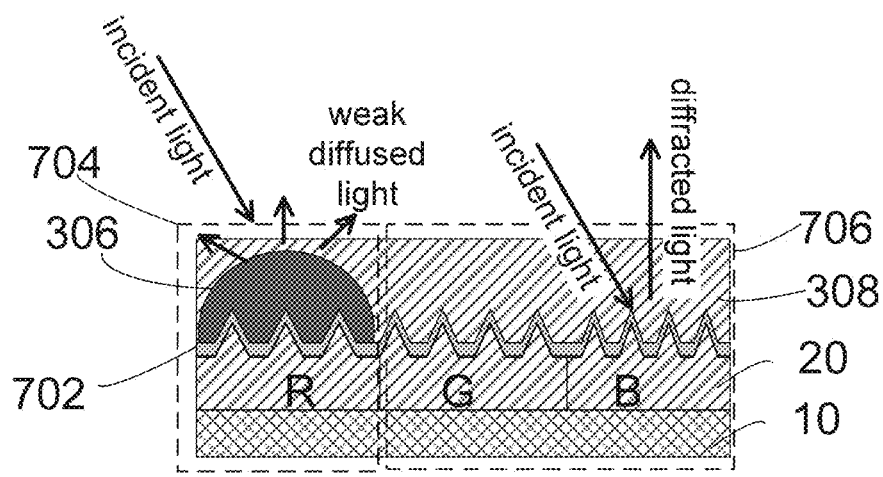
FIG. 7C shows a schematic cross sectional view of laminating the printed device surface with index matching film and the interaction of the device with light incident from top.

Reference is now made to FIGS. 7A, 7B and 7C which show schematic views of deactivating one red subpixel that is pre-coated with a thin contrast film. FIG. 7A and FIG. 7B show the schematic top view and cross sectional view, respectively, of ink material 306 deposited onto the red subpixel of a pixel set 12. Prior to the selective deposition, the pixel layer 20 is pre-coated by a thin contrast film 702 composed of a material having different refractive index than the material composing the pixel layer 20, and in an example embodiment, is metal, such as silver, aluminum, gold or high refractive index material such as indium tin oxide, zinc oxide, titania and zinc sulfide. In order to deactivate the subpixel, the ink material 306 should be composed of a material that can efficiently attenuate light, and in an example embodiment, is black ink, such as carbon inks, and metal, such as silver, aluminum and gold. It should be clarified that if metal-based ink is used as the ink material 306, the ink composition and/or surface chemical properties of the pixel layer 20 must be configured such that the deposited metal forms into an optically thick film (thickness ≥200 nm). After the material deposition process, the device is laminated with a protection layer. FIG. 7C shows a cross sectional view of the lamination process where a layer 308 is coated on top of the device. The lamination process is typically carried out by applying a liquid polymer material that can be cured by heat or ultra-violet radiation. In region 704, the structural color of red subpixel is blocked by the light-attenuating ink material 306 deposited on top of said subpixel. In region 706, the green and blue subpixels remain active in displaying structural colors. As a result, the pixel set display cyan color.

It should be clarified that whether a subpixel can be activated or deactivated depends on not only the ink composition or pixel layer surface chemical properties but also the types of the structural pixels. Provided the same ink composition and pixel layer surface chemical properties, the ink material may activate one type of subpixel structures while deactivate a different type of subpixel. In the example embodiments, each drop of ink material is deposited onto a single individual subpixel to activate or deactivate the subpixel. Alternatively, each drop of ink material can be deposited onto more than one subpixel to activate or deactivate multiple subpixels.

Figure 8A:
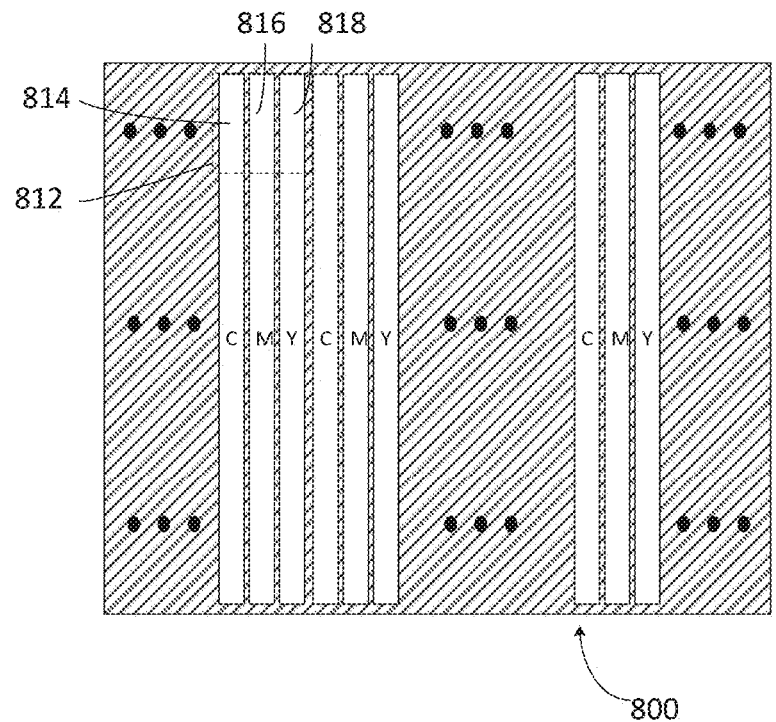
FIG. 8A shows a schematic top view of an alternative configuration of the primary color subpixels in CMY color space.

Although in the above-described example embodiments, red, green and blue subpixels in RGB color space are used in the generic substrate, the presented methods and devices can also be generalized and applied to a generic substrate comprising cyan, magenta and yellow subpixels in CMY color space. Reference is now made to FIG. 8A which shows a schematic top view of the generic substrate 800. Each pixel set 812 comprises at least two types of subpixels, which are typically in a same region or proximity. For example, the pixel set 812 may include at least three color subpixels, cyan subpixel 814, magenta subpixel 816 and yellow subpixel 818. The cyan, magenta and yellow subpixels are used to display visible color images in subtractive color scheme.

Figure 8B:
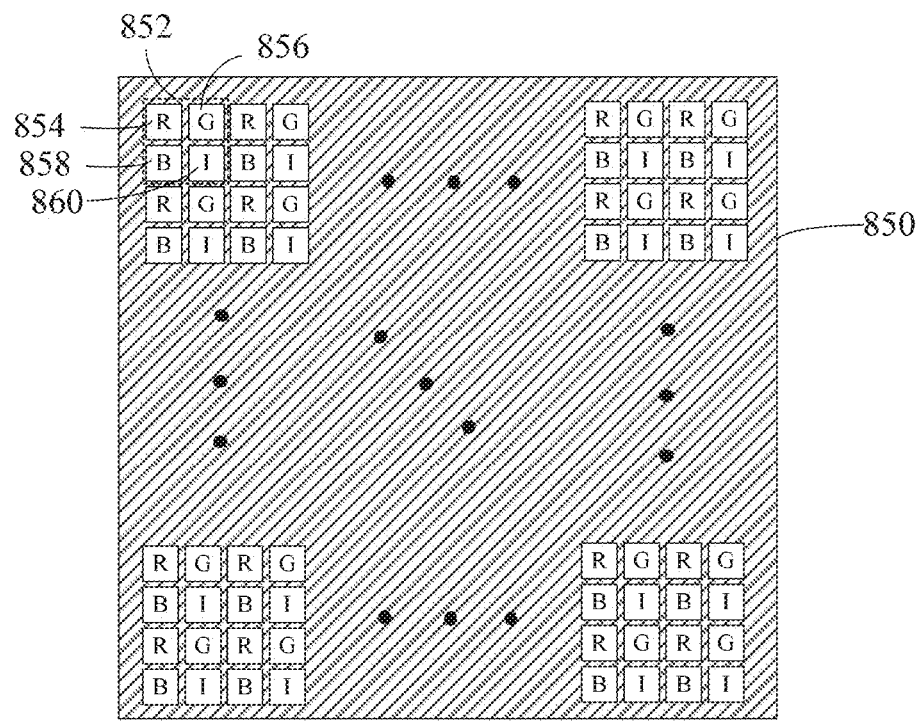
FIG. 8B shows a schematic top view of an alternative configuration of the primary color subpixels including invisible subpixels arranged in 2-D arrays.

Although in the above-described example embodiments, 1-D arrays of subpixel stripes are used in the generic substrate, the presented methods can also be generalized and applied to a generic substrate comprising 2-D array of subpixels. Reference is now made to FIG. 8B which shows a schematic top view of the generic substrate 850. Each pixel set 852 comprises at least two types of subpixels, which are typically in a same region or proximity. For example, the pixel set 852 may include at least three primary color subpixels, red subpixel 854, green subpixel 856, blue subpixel 858 and one additional infrared subpixel 860. The red, green and blue subpixels are used to display visible color images and the infrared (I) subpixel is used to embed covert information (machine readable) into the color image display device.

In some example embodiments, the generic substrate may be simplified for producing color image display devices displaying simple colors. For example, a generic substrate may contain only red and green primary color subpixels and can be used to produce a color image display that only contain colors presentable by mixture of red and green colors. A generic substrate may also comprise multiple regions and each said region has at least one color in the pixel layer and selective material deposition is used to pattern these regions to display simple color patterns.

Although in the above-described example embodiments, nano-pillar arrays are used to construct the structural pixels of the generic substrate, other structures can also be used, including without limitation, nano-hole array 2-D gratings, 1-D gratings, plasmonic nanostructures.

Figure 9:
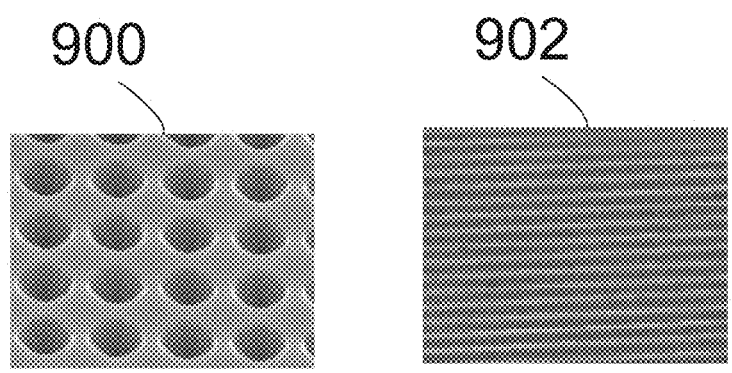
FIG. 9 shows scanning electron microscope images of alternative diffraction grating pixel configuration.

Reference is now made to FIG. 9, which shows two alternative structural pixel structures based on light diffraction. Image 900 is a 45° SEM image of a 2-D nano-hole array grating in which, the diffraction color is determined by the periods between the holes, the light incident angle and viewing angle, similar to the 2-D nano-pillar array gratings used in above-described embodiments. The period of the 2-D nano-hole array grating is usually between 400 nm and 1200 nm. Image 902 is a 45° SEM image of a 1-D grating in which, the diffraction color is determined by the periods between the grooves, the light incident angle and viewing angle. The period of the 1-D grating is usually between 400 nm and 1200 nm.

Figure 10:
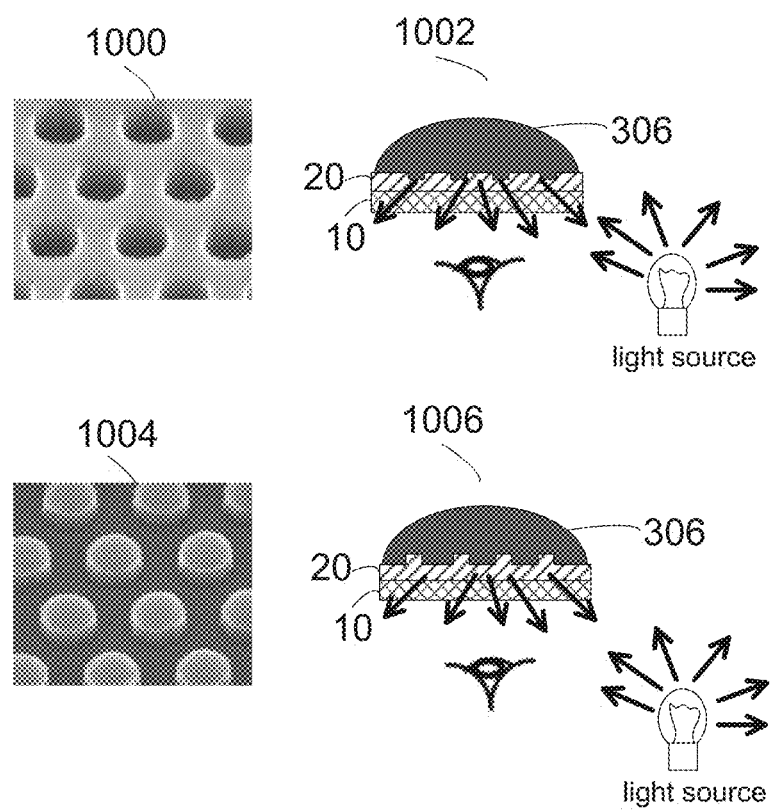
FIG. 10 shows scanning electron microscope images and schematic of alternative sub-wavelength structural pixels that display colors via surface plasmons.

Reference is now made to FIG. 10, which shows two types of structural pixel structures based on sub-wavelength plasmonic nanostructures. It should be noted that, in the plasmonic nanostructures, metal film is required on top of the nanostructures and the colors are caused by the surface plasmons at the interface between nanostructures and the deposited metal. Image 1000 is a 45° SEM image of a 2-D nano-hole array composing one subpixel of the generic substrate. Image 1002 schematically shows the structural colors displayed by an activated plasmonic nanostructure. Ink material 306 is metal based and, in an example embodiment is silver. As a silver ink droplet is deposited on top of a subpixel structure as shown in image 1000, silver ink flows inside the nano-holes and form into a silver film with silver nano-pillars or nano-disks at the bottom of the silver film. In accordance with the teaching of Si et al. (Nanoscale, 5, 6243, 2013), various structural colors can be achieved by adjusting the diameters and periods of the silver nano-pillars or nano-disks. For visible colors, the period is usually between 100 nm and 400 nm and the diameter of the nano-disk or nano-pillar is usually between 30 nm and 350 nm. It should be noted that the structural colors displayed by the silver nano-pillar or nano-disk array as shown in image 1002 can be angle-insensitive which shift very little with varying angle and the colors are usually viewed in reflection mode. Image 1004 is a 45° SEM image of a 2-D nano-pillar array composing one subpixel of the generic substrate. Image 1006 schematically shows the structural colors displayed by an activated plasmonic nanostructure. As a silver ink droplet is deposited on top of a subpixel structure as shown in image 1004, silver ink flows inside the nano-pillars and form into a silver film with silver nano-holes at the bottom of the silver film. In accordance with the teaching of Wu et al. (Scientific Reports, 3, 1194, 2013), such nano-cavities could act as nano-resonators to filter the reflected light to produce structural colors. The color mainly depends on the diameter and the depth of the nano-holes and may slightly depend on the periods as well. For visible colors, the period is usually between 100 nm and 400 nm and the diameter of the nano-hole is usually between 30 nm and 350 nm. It should be noted that the structural colors displayed by the silver nano-hole array as shown in image 1006 can be angle-insensitive which shift very little with varying angle and the colors are usually viewed in reflection. Other types of plasmonic structures can also be used to construct the subpixel structures in the pixel layer of a generic substrate.

In the above-described example embodiments, the generic substrate having ink material deposited on top, with or without index-matching lamination layer, acts as an independent color image device. In an example embodiment, there is provided a method for manufacturing color image display devices wherein the functioning layer in contact with the pixel layer is transferred to a different surface and the generic substrate is reusable to manufacture a different color image display device.

Figure 11:
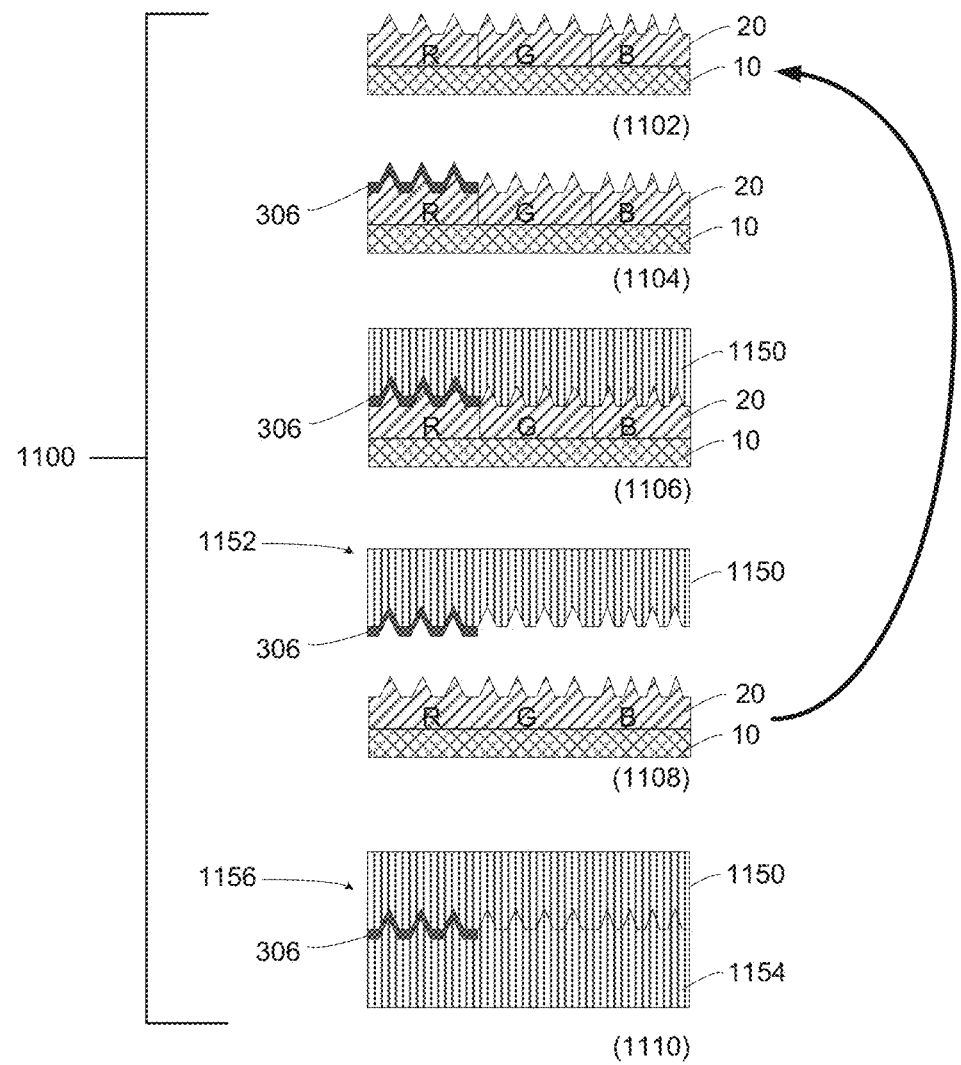
FIG. 11 shows a method of manufacturing color image display devices from a reusable generic substrate.

Reference is now made to FIG. 11, which schematically shows a method 1100 for manufacturing color image devices from a reusable generic substrate. At event 1102, there is provided a generic substrate comprising substrate layer 10 and pixel layer 20. At event 1104, ink material 306 is selectively deposited on top of the red subpixel and the deposited material is structured with topologies conformal to the subpixel. At event 1106, a glue layer 1150 is introduced to the deposited surface. The glue layer 1150 is in direct contact with the pixel layer 20 and is sufficiently bonded with the structured deposited material 306. At event 1108, the structured deposited material 306 is separated from the generic substrate. A color image display device 1152 comprising layer 1150 and structured deposited material 306 is obtained. The device 1152 may function as an independent display device or may require coating additional layers on top (as shown in event 1110). After separation, the generic substrate is cleaned with organic solvents and ready to be used to manufacture a different color image display device. At event 1110, the device 1152 is laminated with a layer 1154 to form a color image display device 1156. There may be additional layers or components connected to layer 1150 and/or layer 1154.

In some example embodiments, the resultant color image display device includes all static layers. For example, in such example embodiments a power source may not be required to control the color image, but rather it is fabricated or uses material deposition to produce the desired color image. In such a case, the color image display device and can be considered a passive device, and the layers can be considered passive layers. The color image display device has pixels of the color image which interact with incident light such as ambient light or natural sunlight.

It should be noted that the generic substrate is not necessarily on a flat surface but may also be positioned onto a curved surface, such as onto the surface of a rolling drum, to enable roll-to-roll manufacturing of the color image display devices based on the manufacturing methods in the example embodiments.

Certain variations may be made to the above-described color image display devices and manufacturing methods, including without limitation, adding certain chemical processing, adding certain physical treatment, adding additional layers, adding additional components such as optical lenses, combinations and sub-combinations of any of the above, without deviating from the teaching of the present disclosure.

It may be appreciated that, using the methods presented in example embodiments, the cost of manufacturing color image display devices based on structural color pixels can be significantly lower than those display devices manufactured with conventional nanofabrication equipment. In some example embodiments, the size of the generic substrate may range from a few millimeters to a few meters. Principally, the size of the generic substrate is only restricted by the material deposition equipment. If roll-to-roll material deposition scheme is applied, there is no physical limit on the length of the color image display device that can be manufactured. In contrast, using conventional nanofabrication equipment, the size of the fabricated color image display device is restricted by the stage size of the equipment and the fabrication cost increases drastically with increasing device size.

It may be appreciated that, using the selective manufacture methods in the example embodiments, personalized or customized information can be practically patterned into the color image display device. The information can vary from one person to a different person, from one product to a different product, from one entity to a different entity.

Figure 12A:
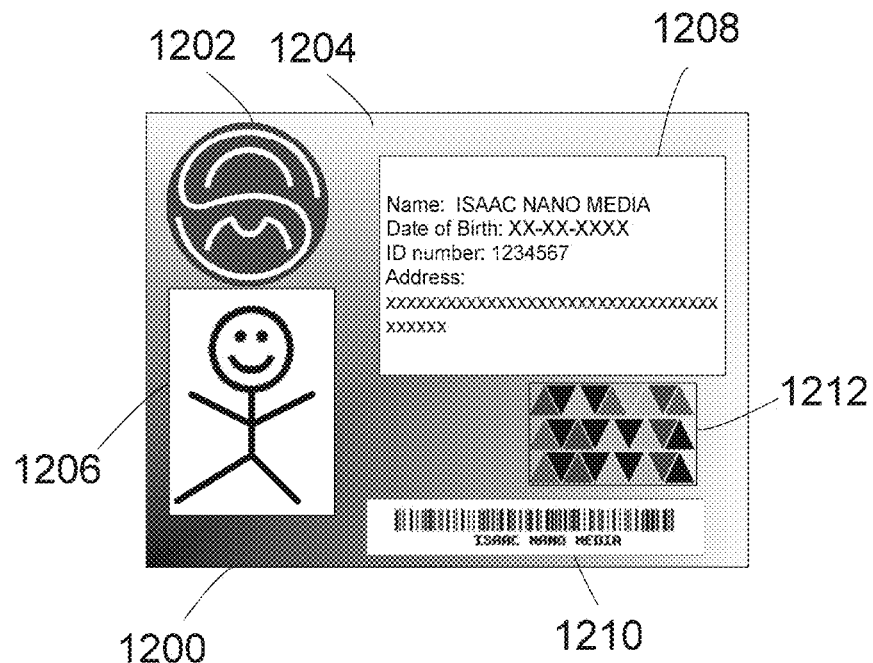
FIG. 12A shows a schematic view of an authentication device carrying personalized information manufactured by selective material deposition.

Reference is now made to FIG. 12A. There is provided an authentication device 1200 comprising at least one color image display device manufactured using the method 300 and/or method 1100 in the example embodiments, and the color image display device carries personalized and customized information that is specific to a person and/or an organization and/or a product and/or an item and/or any being. The device 1200 can carry at least two types of information. One type of information, such as the logo 1202 and background region 1204, is a color pattern or information that is universal for all persons that can be issued with one such authentication device. Another type of information, such as in region 1206, region 1208, region 1210 and region 1212, is information personalized to the specific person being issued with the authentication device. The personalized information may include without limitation, photo, picture, texts, 1-D bar codes, color bar codes and biometric information.

Figure 12B:
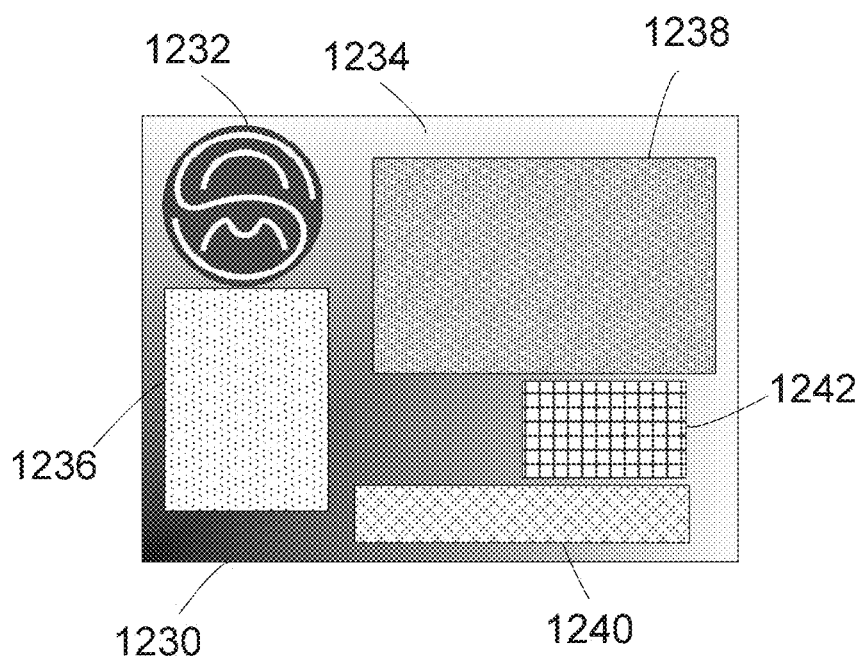
FIG. 12B shows a schematic view of a substrate used to manufacture personalized authentication devices by selective material deposition.

The entire device 1200 can be manufactured using the method 300 and/or method 1100 from a generic substrate 100 that is at least the size of the device 1200. Alternatively, certain regions of device 1200 can be manufactured using method 300 and/or method 1100 while remaining regions can be manufactured using other techniques, such as intaglio printing, conventional color ink printing and thermal embossing. Reference is now made to FIG. 12B. There is provided a substrate 1230 comprising multiple regions: region 1232, background region 1234, region 1236, region 1238, region 1240 and region 1242. Region 1232 and background region 1234 are used to carry information that maybe universal and these said regions can be patterned independently from other regions using different techniques. Each region of 1236, 1238, 1240 and 1242 is composed of a generic substrate 100 and each said region may have a different layout in the pixel layer 20 of the generic substrate. Personalized or customized information is patterned into the separate generic substrate regions using the selective material deposition as provided in the method 300 and/or method 1100.

It should be noted that the personalized authentication device shown in FIG. 12A is merely one example of how the example embodiments can be applied. Other display devices and information carriers, including without limitation, banknotes, product labels, artistic items, ID cards, passports, certificates, can also include the color image display devices manufactured using the methods and materials described in the example embodiments. By way of non-limiting example, a banknote may include at least one region comprising the color display device 330 or 1156 that carries information specific to the very piece of said banknote (serial number, for example). A product label may include at least one region comprising the color display device 330 or 1156 that carries information specific to the very piece of product, such as production date, expiry date, and the information can be printed into the label using the methods in the example embodiments. The personalized and customized information displayed on the device manufactured using the methods and materials described in the example embodiments may show special optically variable effects and may not be easily unscrupulously copied.

In the above-described embodiments, the different structural pixels are in the same pixel layer and the different pixels on the layer are selectively activated or deactivated by material deposition. Alternatively, the color image device can also be manufactured from multiple generic substrates wherein each said generic substrate has at least one defined structural colors and each said generic substrate is patterned separately by selective material deposition and different patterned generic substrates are bonded together with alignment to form into a combined full-color pattern.

Figure 13A:
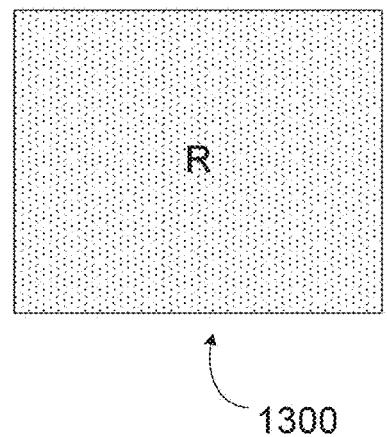
FIG. 13A shows a schematic top view of a generic substrate comprising micro-/nano-structures to display red color.
Figure 13B:
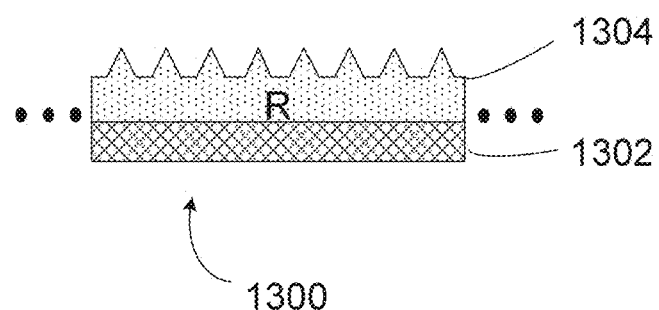
FIG. 13B shows a schematic side view of a generic substrate comprising micro-/nano-structures to display red color.
Figure 13C:
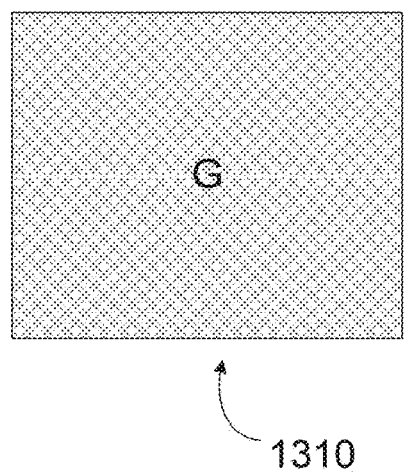
FIG. 13C shows a schematic top view of a generic substrate comprising micro-/nano-structures to display green color.
Figure 13D:
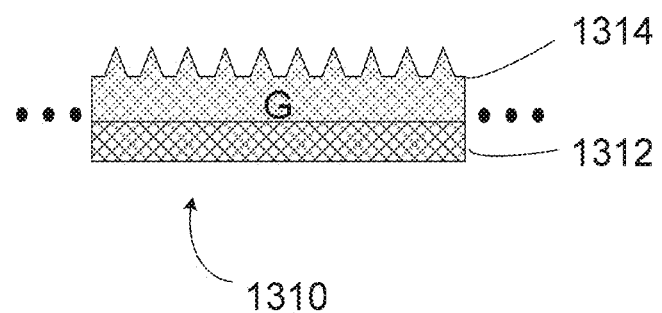
FIG. 13D shows a schematic side view of a generic substrate comprising micro-/nano-structures to display green color.
Figure 13E:
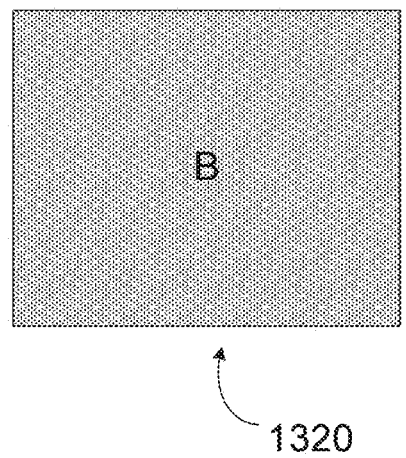
FIG. 13E shows a schematic top view of a generic substrate comprising micro-/nano-structures to display blue color.
Figure 13F:
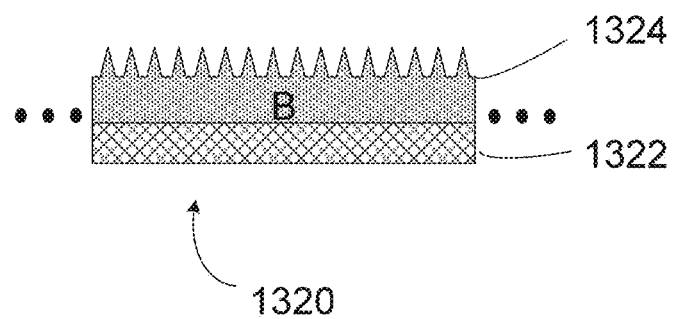
FIG. 13F shows a schematic side view of a generic substrate comprising micro-/nano-structures to display blue color.

Reference is now made to FIGS. 13A, 13B, 13C, 13D, 13E, and 13F. There are provided schematic drawings of different generic substrates. FIG. 13A shows a schematic top view of a generic substrate 1300 comprising micro-/nano-structures to display red color. FIG. 13B shows a schematic side view of the generic substrate 1300 comprising micro-/nano-structures to display red color. Generic substrate 1300 is comprised of a transparent substrate layer 1302 and a pixel layer 1304 composed of structural pixels to display red color. FIG. 13C shows a schematic top view of a generic substrate 1310 comprising micro-/nano-structures to display green color. FIG. 13D shows a schematic side view of the generic substrate 1310 comprising micro-/nano-structures to display green color. Generic substrate 1310 is comprised of a transparent substrate layer 1312 and a pixel layer 1314 composed of structural pixels to display green color. FIG. 13E shows a schematic top view of a generic substrate 1320 comprising micro-/nano-structures to display blue color. FIG. 13F shows a schematic side view of the generic substrate 1320 comprising micro-/nano-structures to display blue color. Generic substrate 1320 is comprised of a transparent substrate layer 1322 and a pixel layer 1324 composed of structural pixels to display blue color. Pixel layers of generic substrate 1300, 1310 and 1320 can all be patterned into a color pattern using the above-described method 300, equipment 350 and method 1100 based on selective activation and/or deactivation of pixels by material deposition.

Figure 14A:
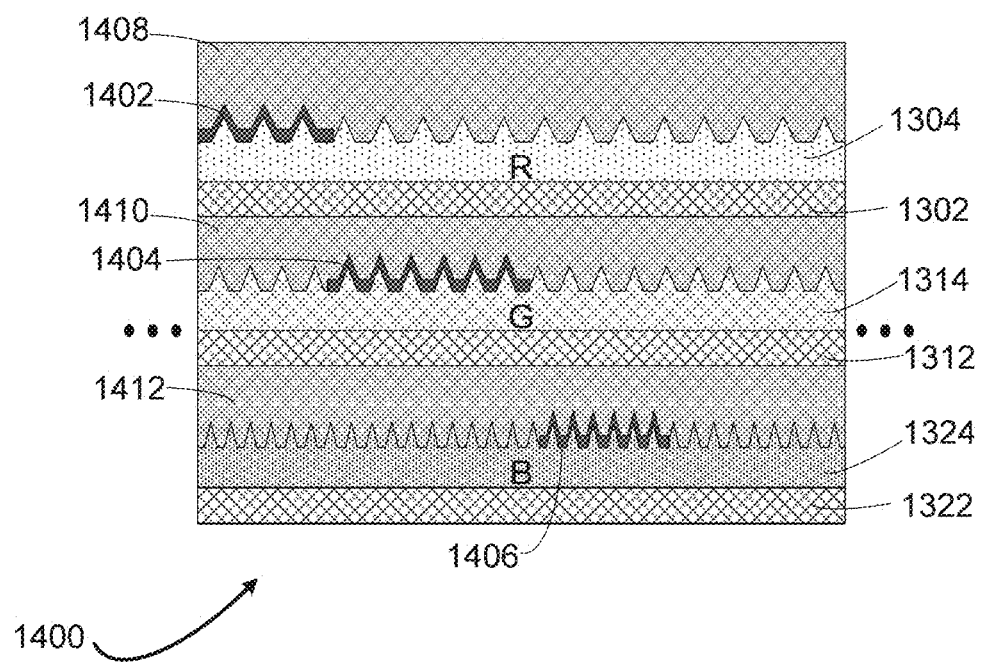
FIG. 14A shows a schematic side view of a color display device manufactured by selective material deposition on separate generic substrates of different types and then bonding the deposited generic substrates together.

After patterning, color patterns are formed onto each generic substrates and all the generic substrates are bonded together with alignment to display a combined color pattern. FIG. 14A shows a schematic side view of a color display device 1400 manufactured by bonding multiple deposited generic substrates together. Layer 1402 is the ink material deposited on top of generic substrate 1300 to generate a pattern in red color. Layer 1404 is the ink material deposited on top of generic substrate 1310 to generate a pattern in green color. Layer 1406 is the ink material deposited on top of generic substrate 1320 to generate a pattern in blue color. Layer 1408, 1410, 1412 are transparent layers serving two purposes: 1) index-matching to deactivate unwanted structural pixels; 2) bonding the layers together. The refractive index of layer 1408, 1410, 1412 is close to or equal to the refractive index of layer 1304, 1314, 1324. The ink material 1402, 1404, 1406 must be composed of a material having different refractive index than the material composing the layer 1304, 1314, 1324, 1408, 1410 and 1412. The ink material 1402, 1404, 1406 is, for example, transparent high-refractive-index material such as indium tin oxide, zinc oxide, titania and zinc sulfide. Inks of metal, such as silver, aluminum and gold can also be used but the color brightness on the bottom layers may be affected by the ink materials deposited on top layers.

Figure 14B:
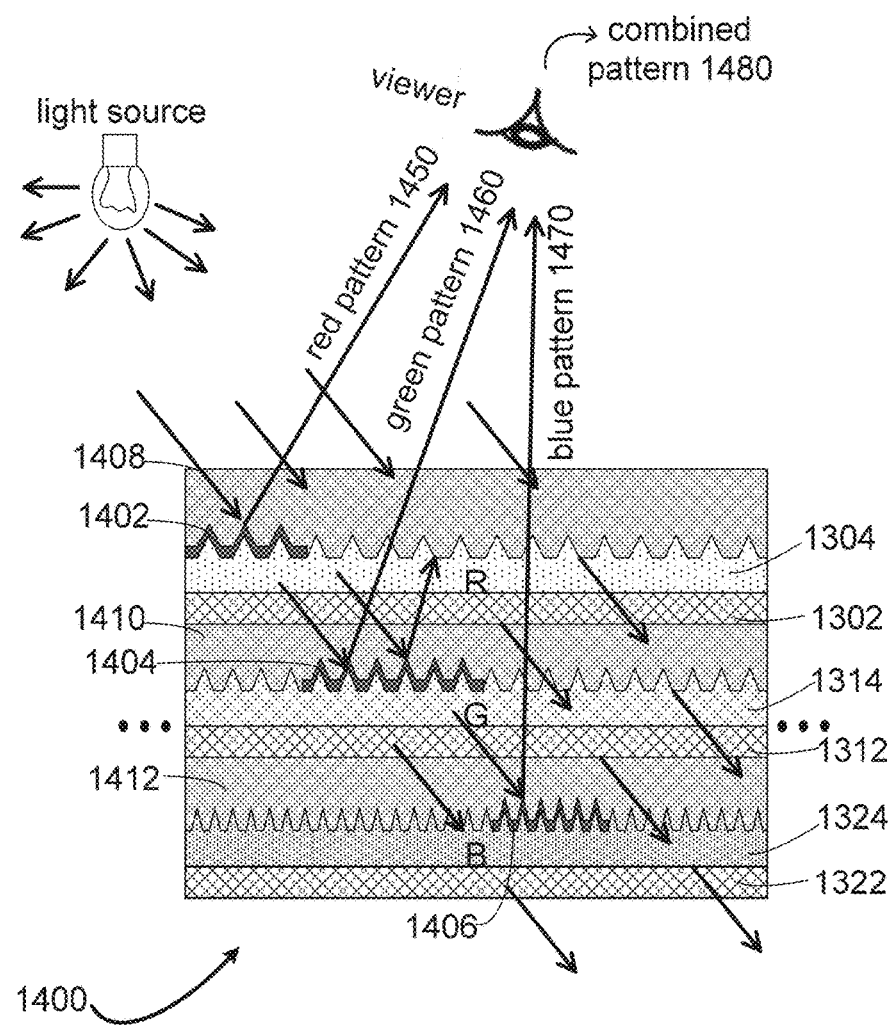
FIG. 14B shows a schematic side view of the color display mechanism of one manufactured color display device comprising multiple layers, wherein each layer is manufactured by selective material deposition on a generic substrate.
Figure 14C:
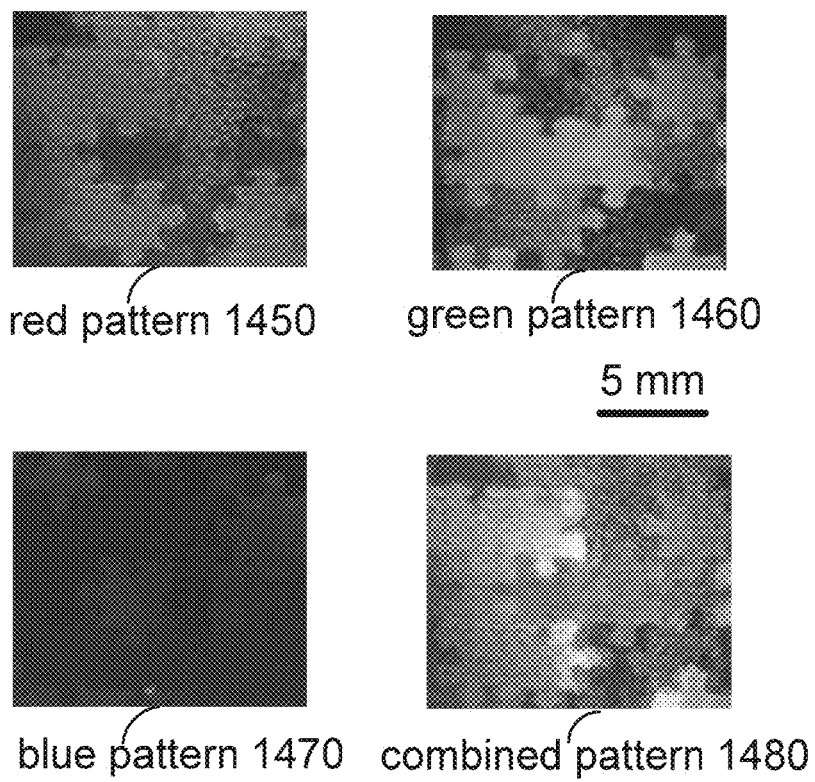
FIG. 14C shows photos of red, green and blue color patterns displayed by individual deposited generic substrate layer and a photo of the bonded device displaying combined color pattern.

FIG. 14B shows a schematic side view of the color display mechanism of one manufactured color display device comprising multiple layers, wherein each layer is manufactured by selective material deposition on a generic substrate. Light from an ambient environment is shone to the display device 1400 and the light propagates through all the layers. The layer 1402 diffracts red light in a red pattern 1450 into the viewer's eyes and allows other colored light to transmit through. The layer 1404 diffracts green light in a green pattern 1460 into the viewer's eyes and allows other colored light to transmit through. The layer 1406 diffracts blue light in a blue pattern into the viewer's eyes and allows other colored light to transmit through. Therefore, the viewer's eyes receive a combined pattern 1480 which is a combination of the patterns in red, green and blue colors. Different colors are achieved by the color mixing following additive color model. FIG. 14C shows the photos of the red pattern 1450 captured from the pattern printed on generic substrate 1300, the green pattern 1460 captured from the pattern printed on generic substrate 1310, the blue pattern 1470 captured from the pattern printed on generic substrate 1320, and the combined pattern 1480 captured from the bonded device 1400. The combined pattern 1480 is as what human eyes can sense, in terms of colors and brightness.

The color image display devices described in at least some of the example embodiments may be used for artistic purposes including clothing material, advertisements and decorative pictures.

The color image display devices described in at least some of the example embodiments may be used for safety applications, such as traffic signs and warning signs, which will enhance the scattered light intensity to make the signs more noticeable to human eyes.

In some example embodiments, reference to layer may not necessarily mean a 2-D plane, but in some example embodiments may be layered onto other types of surfaces, such as a curved surface, or a patterned surface such as ridges, waves, etc., or in or around a 3-D object, etc. Reference to layer can also include a 1-D pattern, for example on a thin thread or a thin fiber.

Certain adaptations and modifications of the described embodiments can be made. Therefore, the above-discussed embodiments are considered to be illustrative and not restrictive. Example embodiments described as methods would similarly apply to systems, and vice-versa.

Variations may be made to some example embodiments, which may include combinations and sub-combinations of any of the above. The various embodiments presented above are merely examples and are in no way meant to limit the scope of this disclosure. Variations of the example embodiments described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

What is claimed is:

1. A color image display device, comprising:
   more than one layer of generic substrates, each generic substrate comprising a pixel layer which is generic to any pattern, said pixel layer including at least one type of structural pixels, each pixel defined by at least one microstructure or nanostructure having at least one specific optical property including a specific optical band or a specific color; and
   an ink material selectively deposited onto individual pixels of the pixel layer in accordance with a pattern to activate or deactivate individual of said pixels to form a color image,
   wherein each said generic substrate displays at least one color and a specific pattern is defined on each said generic substrate separately by the selective ink material deposition.

2. The color image display device as claimed in claim 1, wherein the pixel layer further comprises pixel sets, each pixel set being defined by a subset of the pixels exclusive to the other pixel sets, wherein at least two of the pixels in each pixel set have a different specific optical property.

3. The color image display device as claimed in claim 2, wherein the pixels for one of the pixel sets have a same respective at least one specific optical property as the pixels for another one of the pixel sets.

4. The color image display device as claimed in claim 2, wherein the pixels for all of the pixel sets have a same respective at least one specific optical property.

5. The color image display device as claimed in claim 2, wherein each subset of pixels for each pixel set includes pixels in proximity to each other to provide an effective output which is perceivable as a combination of the individual pixels; said pixels being arranged into 1-D pattern or 2-D pattern.

6. The color image display device as claimed in claim 2, wherein each subset of pixels for each pixel set includes: 1) pixels which are red, green and blue; or 2) pixels which are cyan, magenta and yellow; or 3) pixels which are colors that define a color space.

7. The color image display device as claimed in claim 6, wherein each subset of pixels further includes at least one pixel having an invisible optical band, wherein the invisible optical band is from at least one of infrared spectrum and ultraviolet spectrum.

8. The color image display device as claimed in claim 1, wherein at least one pixel structure further comprises: an array of nano-apertures; or an array of nano-pillars; or an array of nano-grooves; or an array of nano-grids; or any other type of diffraction grating structures; or sub-wavelength structures that display colors provided a specific layer coated on the surface of said sub-wavelength structures, said specific layer being composed of metal or dielectric material or combination of both; or a combination or a sub-combination thereof.

9. The color image display device as claimed in claim 1, further comprising one or more fiducial marks on at least one of the layers or one of the generic substrates for aligning the generic substrates relative to a manufacture instrument.

10. The color image display device as claimed in claim 1, wherein at least one pixel is configured to display the respective specific optical band due to: transmission of incident light; or reflection of incident light; or diffraction of incident light; or interference of light; or absorption of incident light; or scattering of incident light; or resonance of incident light; or a combination or sub-combination thereof.

11. The color image display device as claimed in claim 1, wherein the pattern of depositing ink material is solely customized in accordance with a specific color image or color pattern and the pixel layer is generic to different color images or color patterns.

12. The color image display device as claimed in claim 1, wherein the ink material is a liquid material or a solid material.

13. The color image display device as claimed in claim 1, wherein the ink material is a liquid material which contains nano-particles composed of metal, dielectric material, and/or light attenuating material including carbon inks.

14. The color image display device as claimed in claim 1, wherein a composition of the ink material and surface chemical properties of the pixel layer are modified to control the activation and/or the deactivation of the pixels.

15. The color image display device as claimed in claim 1, wherein at least one or both sides of the ink material having structures conformal to the structures of the pixels in the pixel layer in contact and the at least one or both sides having structures conformal to the structures interact with light to display structural colors.

16. The color image display device as claimed in claim 1, wherein both sides of the ink material have structures conformal to the structures of the pixels in the pixel layer in contact to selectively activate individual pixels.

17. The color image display device as claimed in claim 1, wherein the deposited ink material forms into one thin-film dot for each of said individual pixels.

18. A security device for authentication purposes, wherein at least one color image or color pattern carrying personalized or customized information that is specific to the entity to be authenticated is produced onto the color image display device as claimed in claim 1.

19. The security device as claimed in claim 18, wherein said security device displays an optically variable graphic which varies based on incident light angle and/or viewing angle.

20. A security device for authentication purposes comprising multiple regions and at least one region is a color image display device as claimed in claim 1, wherein at least one color image or color pattern carrying personalized or customized information that is specific to the entity to be authenticated is produced onto said color image display device.

21. The security device as claimed in claim 20, wherein said security device displays an optically variable graphic which varies based on incident light angle and/or viewing angle.

22. An authentication device comprising at least one color image display device as claimed in claim 1, wherein an image of a person or other personalized information is displayed on said color image display device; wherein said image of said person displays an optically variable graphic of said person; and wherein said person's identifying information or other data also displays an optically variable graphic for enhanced security.

23. A product label comprising at least one color image display device as claimed in claim 1, wherein customized information of a specific product is displayed on said color image display device; wherein said customized information displays an optically variable graphic for artistic purpose and enhanced security.

24. A tangible optical storage medium for information storage and information communication, wherein information is encoded as color patterns, black/white patterns, covert patterns, and binary data, produced onto the color image display device as claimed in claim 1.

25. The tangible optical storage medium as claimed in claim 24, wherein the information in said optical storage medium is at least partially readable by way of a visible optical band.

26. The tangible optical storage medium as claimed in claim 24, wherein the information in said optical storage medium is at least partially readable or recoverable using a reader device.

27. The tangible optical storage medium as claimed in claim 26, wherein the reader device is further configured to detect radiation in an invisible optical band.

28. The color image display device as claimed in claim 1, further comprising:
   intermediate layers bonding between each generic substrate.

29. The color image display device as claimed in claim 1, wherein the specific pattern defined on individual said generic substrates are aligned relatively to each other to collectively form into a full-color pattern.

30. The color image display device as claimed in claim 1, wherein each specific pattern displays one color of a color space to collectively form into a full-color pattern.

31. A substrate comprising multiple functioning regions and at least one region having more than one layer of generic substrates; wherein a desired color image or color pattern is manufactured onto each individual generic substrate using a method, the method including: generating a binary print pattern; and selectively depositing ink material in accordance with the binary print pattern onto individual pixels of a pixel layer of that generic substrate, said pixel layer being generic to any pattern and including at least one type of structural pixels, each pixel defined by at least one microstructure or nanostructure having at least one specific optical property including a specific optical band or a specific color, the deposited ink material being aligned with that generic substrate, the deposited ink material being formed into at least one thin-film dot for each of said individual pixels, at least one or both sides of the thin-film dots having structures conformal to the structures of the pixels in contact, wherein each said generic substrate displays at least one color and a specific pattern is defined on each said generic substrate separately by the selectively depositing ink material.

32. A color image display device, comprising more than one layer of generic substrates that has a curved surface and the color image display device is manufactured by mounting each individual generic substrate to a rolling drum; and wherein multiple color image display devices are manufactured in a roll-to-roll scheme using a method for manufacturing the color image display device, the method including: determining a desired color image or color pattern; generating a binary print pattern; and selectively depositing ink material in accordance with the binary print pattern onto individual pixels of a pixel layer of that generic substrate, said pixel layer being generic to any pattern and including at least one type of structural pixels, each pixel defined by at least one microstructure or nanostructure having at least one specific optical property including a specific optical band or a specific color, the deposited ink material being aligned with that generic substrate, the deposited ink material being formed into at least one thin-film dot for each of said individual pixels, at least one or both sides of the thin-film dots having structures conformal to the structures of the pixels in contact, wherein each said generic substrate displays at least one color and a specific pattern is defined on each said generic substrate separately by the selectively depositing ink material.

33. A color image display device as claimed in claim 32, wherein the more than one layer of generic substrates is in a format of a roll of foils.

\* \* \* \* \*